United States Patent [19]

Chiang et al.

[11] 4,337,233
[45] Jun. 29, 1982

[54] PREPARATION OF STRONTIUM NITRATE FROM CELESTITE AND CALCIUM NITRATE

[75] Inventors: John S. Chiang, Mercerville; David Goldstein, East Brunswick, both of N.J.

[73] Assignee: FMC Corporation, Philadelphia, Pa.

[21] Appl. No.: 273,282

[22] Filed: Jun. 12, 1981

[51] Int. Cl.$^3$ ............................................. C01F 11/40
[52] U.S. Cl. ..................................... 423/397; 423/162
[58] Field of Search ................ 423/397, 395, 162, 170

[56] References Cited

U.S. PATENT DOCUMENTS

| | | | |
|---|---|---|---|
| 2,030,659 | 2/1936 | Shreve et al. | 423/497 |
| 2,158,162 | 5/1939 | Turner | 423/160 |
| 2,952,641 | 9/1960 | McKenzie | 423/162 |
| 3,010,788 | 11/1961 | Glueckhauf | 423/2 |
| 3,287,084 | 11/1966 | Van Tuyl | 423/2 |

OTHER PUBLICATIONS

"Chem Abst." vol. 2; 1915; p. 2176.
R. N. Shreve et al., "Making Strontium Nitrate and Strontium Chloride from Strontium Sulfate Using Organic Solvents", Purdue University Bulletin No. 67, vol. XXIII, No. 32, Jun. 1939.
R. N. Shreve et al., Ind. Eng. Chem. 31, 1173, (1939).
J. Am. Chem. Soc. 64, 1301–1303, (1942).

Primary Examiner—G. O. Peters
Attorney, Agent, or Firm—Christopher Egolf

[57] ABSTRACT

Strontium nitrate is prepared by reacting celestite (strontium sulfate) with excess calcium nitrate in limited amounts of water, quickly extracting strontium nitrate from the reaction mixture by vigorous agitation with additional water, and recovering strontium nitrate by evaporation of the extract solution.

16 Claims, 2 Drawing Figures

PREPARATION OF STRONTIUM NITRATE FROM CELESTITE AND CALCIUM NITRATE

BACKGROUND OF THE INVENTION

1. Field of the Invention

The present invention relates to the preparation of strontium nitrate by the reaction of strontium sulfate with calcium nitrate.

2. Description of the Prior Art

Strontium nitrate, which finds principal use in pyrotechnic applications for its red-colored flame, is typically derived from celestite, a strontium sulfate-containing ore.

In the most direct commercial manufacturing method, celestite ore is heated with an aqueous soda ash (sodium carbonate) solution to yield strontium carbonate as a precipitate. The separated strontium carbonate is reacted with aqueous nitric acid to form strontium nitrate, which is recovered by crystallization.

Strontium nitrate may alternatively be obtained from celestite ore via the "black ash" process, in which celestite is reduced to strontium sulfide black ash by heating with coal. The strontium sulfide is leached from the black ash with water, reacted with soda ash to form strontium carbonate, and the separated strontium carbonate treated with aqueous nitric acid to yield strontium nitrate.

A drawback to these and other similar processes is the multiple reaction steps and reactant materials required to produce strontium nitrate from the strontium sulfate-containing celestite ore.

U.S. Pat. No. 2,158,162 teaches that strontium nitrate may be obtained from celestite by boiling the latter in an aqueous barium nitrate solution. Barium sulfate precipitates from the aqueous reaction medium, leaving a solution from which strontium nitrate may be crystallized. A disadvantage of this technique is its dependence on barium nitrate as a reactant.

U.S. Pat. No. 2,030,659 teaches a single-reaction technique for converting barium or strontium sulfate to the corresponding nitrate (or chloride) by reaction with calcium nitrate (or chloride). Because the reaction is readily reversible, the reaction is first driven to completion by use of concentrated reactant solutions, and the reaction product is then extracted with a suitable organic solvent. The organic solvent is then evaporated to recover the extracted product.

It has been discovered that strontium nitrate may be obtained from celestite in a single-reaction process while nevertheless avoiding the drawbacks associated with the use of an organic solvent extractant for recovering the strontium nitrate product from the reaction medium.

SUMMARY OF THE INVENTION

In accordance with the present invention, strontium nitrate is prepared from celestite ore by the process involving the following steps. Crushed or ground celestite ore is mixed with greater than a stoichiometric quantity of calcium nitrate in an aqueous reaction mixture to react strontium sulfate in the celestite with calcium nitrate, the reaction mixture containing insufficient water to solubilize all strontium values in the celestite as strontium nitrate. The reaction mixture is contacted, quickly and with vigorous agitation, with additional water to rapidly dissolve and extract the soluble strontium nitrate reaction product, the total quantity of added water and reaction mixture water being from 100 to 140% of the amount required to solubilize essentially all of the strontium nitrate in the reaction mixture. The aqueous solution containing solubilized strontium nitrate and unreacted calcium nitrate is separated from the undissolved reaction mixture solids. Water is evaporated from the separated aqueous solution to induce crystallization of strontium nitrate, and the strontium nitrate is recovered.

A preferred cyclic embodiment of the invention includes recycling mother liquor, which remains after crystallization and recovery of strontium nitrate and which contains unreacted calcium nitrate, for use in the reaction of additional celestite with calcium nitrate. Additional calcium nitrate is desirably introduced in such cyclic embodiments to replace that which was reacted with strontium sulfate and is preferably added to the separated aqueous solution, prior to its being evaporated to crystallize strontium nitrate.

DETAILED DESCRIPTION

Figure 1:
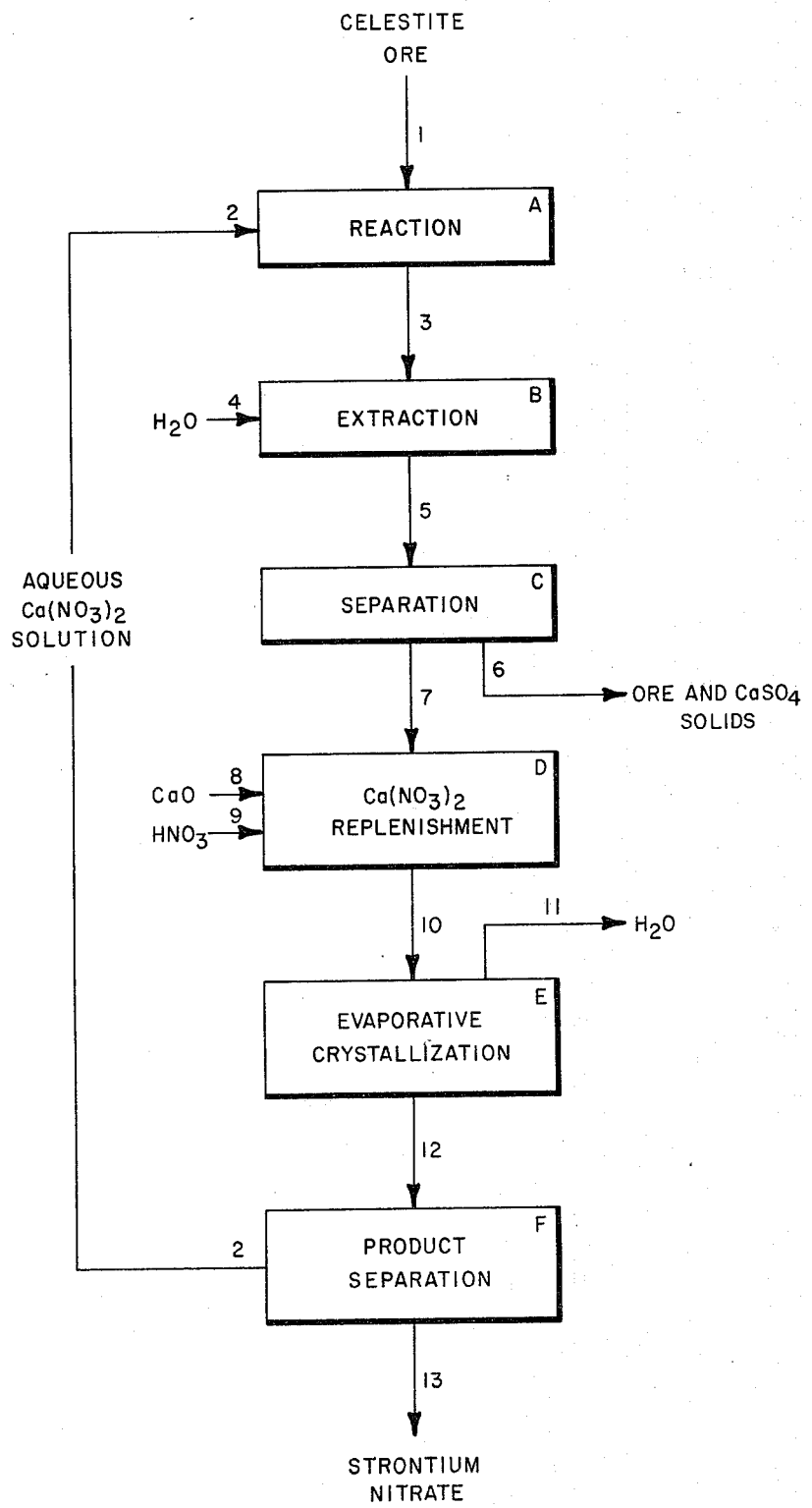
FIG. 1 depicts a flow sheet showing the cyclic, continuous preparation of strontium nitrate in a preferred embodiment of the invention.

Celestite that is employed in this invention is the natural ore whose principal component is strontium sulfate. Both high purity and low grade celestite ores are suitable for use in the invention, since the presence of non-$SrSO_4$ components in the treated ore does not significantly decrease process efficiency. Strontium sulfate-containing ores other than celestite, as well as wastes or tailings containing strontium sulfate (e.g., leaching mud from a black ash process) may also be utilized in the process of this invention. All such $SrSO_4$-containing materials are intended to be included in the definition of "celestite ore" suitable for use in this invention.

The celestite rock should be crushed, pulverized, or ground and is preferably ground into a powder, so as to provide adequate dissolving surface for satisfactory reaction rates. Ore particle sizing should preferably range from an average of 1–150 microns, more preferably 10–50 microns. Excessively fine grinds of celestite ore are usable and may promote rapid reaction times, but are ordinarily not commercially economical.

The calcium nitrate that is reacted with the celestite is ordinarily prepared from the reaction of lime (CaO) with nitric acid ($HNO_3$). Other calcium compounds such as $Ca(OH)_2$ and $CaCO_3$ may be used in place of CaO. The calcium nitrate may be prepared as described, either as a solution to be utilized when needed or formed in situ such as in recycled mother liquor in cyclic embodiments of the invention.

Because celestite ore typically contains calcium compounds such as $CaCO_3$, a portion of the requisite calcium nitrate reactant may be derived from such calcium components of celestite ore by adding sufficient nitric acid to the reaction mixture to form $Ca(NO_3)_2$.

The mixing and reaction of celestite and calcium nitrate may be performed either batchwise or continuously, using conventional reactors designed for such reactions. Agitation of the reactor contents is desirable to achieve good mixing and contact of the reactants.

In the reaction of calcium nitrate with the strontium sulfate content of the celestite ore, a primary objective of the invention is to drive the reaction substantially to completion, thus forming the maximum amount of strontium nitrate. The three parameters which are controlled in the reaction mixture to achieve this objective are atomic ratio of calcium to strontium, the amount of water employed in the reaction mixture, and reaction temperature.

The reaction is carried out with the quantity of calcium nitrate being in stoichiometric excess of that needed to react with the strontium sulfate content of the celestite ore. The stoichiometric excess of calcium nitrate is desired because it apparently drives the reaction to completion by depressing the solubility of the calcium sulfate byproduct.

The atomic ratio of calcium (Ca) to strontium (Sr) in the reaction mixture must be greater than 1, and is preferably greater than 2.5 up to about 6. Atomic ratios of Ca:Sr in excess of 6 are feasible; however, the increase in reaction rate is penalized by the need for larger quantities of water in the extraction step to overcome the depressed $Sr(NO_3)_2$ solubility due to the high $Ca(NO_3)_2$ concentration. Such large volumes of water are undesirable since they promote the likelihood of reaction reversion and must be evaporated during crystallization of the $Sr(NO_3)_2$ reaction product.

The amount of water employed in the reaction mixture should be minimally sufficient to provide complete mixing of the reactants. It should be less than that amount which would be capable of solubilizing at one time all of the strontium values in the celestite as strontium nitrate. The quantity of water is desirably minimized, being an amount sufficient to provide a concentrated reaction slurry and to allow complete conversion of strontium sulfate. Excessive water in the reaction mixture is undesirable because the reaction products may be solubilized and reversion of the reaction may occur.

The following reaction is believed to occur in the reaction mixture:

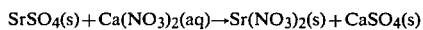

During the course of the reaction, solid strontium sulfate in the celestite is believed to be continually dissolved into the reaction mixture and reacted with calcium nitrate in solution, with reaction products strontium nitrate and byproduct calcium sulfate continually precipitating as solids due to their limited solubility in the reaction mixture. The reaction apparently proceeds in this fashion until substantially all of the strontium sulfate has been reacted, by its gradual dissolution and reaction with the excess calcium nitrate during the reaction period.

The optimum amount of water may be correlated with the Ca:Sr atomic ratio and with the quantity of calcium nitrate employed. If the Ca:Sr atomic ratio is designated as R, the molar ratio of water ($H_2O$) to strontium (Sr) desired in the reaction mixture may then be expressed as being at least $2(R-1)$ but not more than $5.5(R-1)$. Preferably, the $H_2O$:Sr molar ratio is within the range $3(R-1)$ to $4.5(R-1)$.

The reaction is preferably carried out at moderate to high temperatures, which minimize calcium sulfate (byproduct) solubility and maximize strontium sulfate (reactant) solubility, thus driving the reaction of calcium nitrate and strontium sulfate to completion. The reaction temperature may be between 75° to 250° C. The preferred reaction temperature range is from 125° to 150° C. with 130° to 145° C. being most preferred.

Atmospheric pressure or higher pressures may be employed for the reaction.

Reaction rate of the calcium nitrate-strontium sulfate reaction is dependent on the above-mentioned parameters and on particle size of the celestite ore.

Reaction times may range from a few minutes, 0.25 hour or less, up to 40 hours. When the reaction parameters are maintained with the preferred ranges, the reaction is substantially completed, at least 80% of fully reacted within 30 minutes. Longer reaction times, 2 to 3.5 hours, are preferred because the reaction may be driven further towards completion.

Upon completion of the reaction step, the reaction mixture is contacted with water to dissolve and extract the soluble strontium nitrate reaction product, along with the unreacted calcium nitrate. The extraction step is performed under conditions which ensure that reversion of the strontium nitrate product (by reaction with calcium sulfate) is minimized and that the strontium nitrate product is recovered in good yields.

The water extraction should be carried out both quickly and with vigorous agitation of the added water and reaction mixture, so that the strontium nitrate is rapidly and fully solubilized. The agitation or mixing period during the water extraction step should be kept short, being less than five minutes. Agitation periods of two minutes or less are preferred. Mixing periods of about a second up to about one minute are most preferred.

The amount of water added during the extraction step is controlled, to provide a total quantity of water that is sufficient to solubilize essentially all of the strontium nitrate present in the reaction mixture. Total quantity of water is defined as including the water in the reaction mixture plus the water added in the extraction step.

The total amount of water required is calculated based on the strontium nitrate solubility in the presence of calcium nitrate. Such calculations may be made by one familiar with extraction techniques from information obtained from the ternary phase diagram shown in FIG. 2 for the system $Sr(NO_3)_2$—$Ca(NO_3)_2$—$H_2O$. The amount of water present during extraction should range from exactly the quantity needed to solubilize the strontium nitrate up to a 40% excess, and is preferably no more than a 20% excess of water.

The temperature of the water during the extraction step is not critical and may range between 0° C. to 100° C.; ambient temperature is preferred.

It may be desirable to precipitate heavy metals present in the reaction mixture prior to recovery of the $Sr(NO_3)_2$—containing aqueous extract solution. To this end, small amounts (0.5-5%) of CaO or $Ca(OH)_2$ may be added along with the extraction water to increase the pH to about 7-11 in the extraction step.

After the mixing during the extraction step has been completed, the aqueous solution is separated from the undissolved reaction mixture solids. The aqueous solution containing solubilized strontium nitrate, as well as unreacted calcium nitrate, is separated from the residual ore and calcium sulfate solids by conventional liquid-solid separation techniques, e.g., filtration or centrifugation. The ore solids and byproduct calcium sulfate, which remain after separation of the $Sr(NO_3)_2$-containing aqueous solution, are ordinarily discarded.

Strontium nitrate is then fractionally crystallized from the aqueous solution from the separation step by evaporation of water. Crystallization is preferably carried out at a temperature above 43° C., since calcium nitrate tetrahydrate may crystallize from concentrated $Ca(NO_3)_2$ solutions below 43° C.

The evaporative crystallization is preferably operated in a fashion that yields an aqueous mother liquor containing a molar ratio of water:calcium nitrate of no less than four. Evaporative crystallization under such conditions, and at a temperature of at least 43° C., recovers substantially all, at least 90%, of the strontium nitrate while avoiding undesired co-crystallization of calcium nitrate.

The crystallized strontium nitrate is recovered by conventional liquid-solid separation procedures. The recovered product crystals may be washed to remove traces of calcium nitrate, before being dried. If entrained calcium nitrate is present in significant amounts, the strontium nitrate may be redissolved in aqueous solution and re-crystallized from solution under vacuum to yield a high purity product.

Overall yields of strontium nitrate, based on strontium sulfate in the celestite reactant, are at least 50% and are usually above 70% in the process of this invention. With preferred operating conditions, yields well in excess of 75% may readily be obtained.

A preferred embodiment of the invention involves operating the strontium nitrate process in a cyclic manner. The mother liquor which remains after separation and recovery of the crystallized strontium nitrate is recycled to use its unreacted calcium nitrate in the reaction of additional celestite. Make-up calcium nitrate may be introduced into the recycled mother liquor to provide the total amount of this reactant desired.

A more preferred alternative or supplemental technique for replenishing calcium nitrate is the introduction of the requisite calcium nitrate into the aqueous solution from the extraction and separation steps. The calcium nitrate is thus introduced prior to crystallization of strontium nitrate from the solution. This procedure is preferred since the large volume of water present in such solutions facilitates the introduction of calcium nitrate via the reaction of lime and nitric acid.

As noted previously, the calcium nitrate supplied for replenishment of that consumed in the reaction may be added as $Ca(NO_3)_2$ or may be prepared in situ by the addition of $CaO$ (or $Ca(OH)_2$ or $CaCO_3$) and $HNO_3$.

A preferred cyclic embodiment of the invention is shown in the flow diagram of FIG. 1. In conjunction with the flow diagram of FIG. 1, FIG. 2 is utilized to illustrate compositions of the aqueous phase at certain points in the preferred cyclic process described below.

Figure 2:
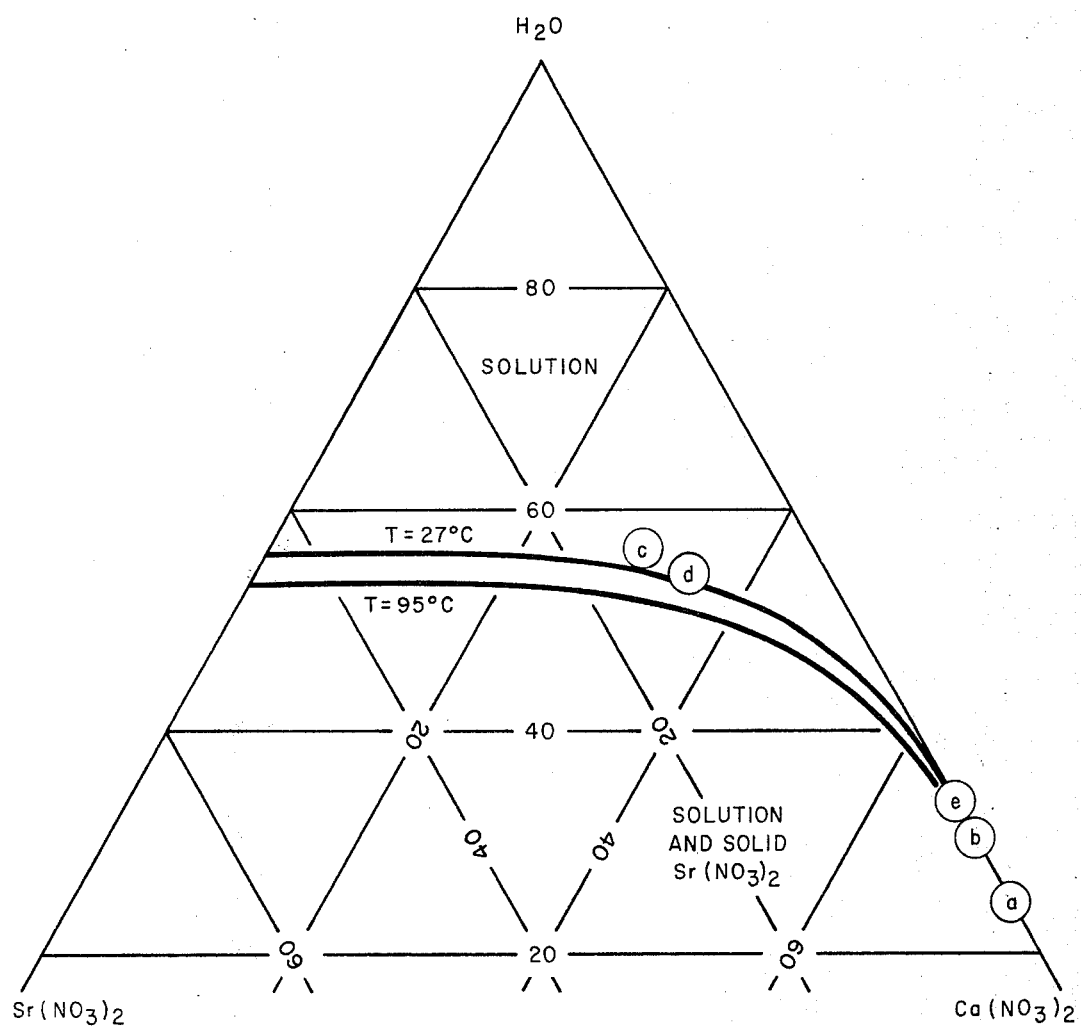
FIG. 2 depicts a ternary diagram for the system $Sr(NO_3)_2$—$Ca(NO_3)_2$—$H_2O$ with isotherms for temperatures of 27° C. and 95° C.

FIG. 2 illustrates a ternary diagram (in part) for the system $Sr(NO_3)_2$—$Ca(NO_3)_2$—$H_2O$ and shows isotherms for temperatures of 27° C. and 95° C. The isotherms in FIG. 2 were obtained using the general technique described by Kobe et al in J. Am. Chem. Soc. 64 1301–1303 (1942). Compositions located on the diagram above an isotherm are solutions. Compositions below an isotherm in the area shown on the diagram are mixtures of solid strontium nitrate in aqueous solution whose composition lies on the isotherm where it is intersected by a line drawn through the point at $Sr(NO_3)_2 = 100\%$ and the mixture composition point.

Celestite ore 1, in finely ground form, and a stroichiometric excess of concentrated aqueous calcium nitrate 2 are introduced into a reactor, where the reaction step shown as Block A in FIG. 1 is performed. Prior to reaction, the aqueous phase of the reaction mixture has a composition noted as point (a) on the ternary diagram for the system $Sr(NO_3)_2$—$Ca(NO_3)_2$—$H_2O$ shown in FIG. 2. After completion of the reaction, the composition of the aqueous phase in the reaction mixture shifts to point (b) in the ternary diagram of FIG. 2 since a portion of the excess calcium nitrate reacts with strontium sulfate in the celestite ore. The strontium nitrate content of the aqueous phase of the reaction mixture is very low, since the reaction product solubility is depressed by the presence of excess calcium nitrate.

The reaction mixture 3 is transferred to an extraction step shown as Block B in FIG. 1, where extraction water 4 is vigorously contacted with reaction mixture 3 to extract strontium nitrate as well as unreacted calcium nitrate, in an extraction period lasting less than 2 minutes.

The slurry 5 from the extraction step is transferred to a liquid-solid separator such as a belt vacuum filter, shown as the separation step in Block C of FIG. 1. Unreacted ore solids and byproduct calcium sulfate solids 6 are removed during the separation and are discarded. The separated aqueous solution 7 containing both solubilized strontium nitrate and unreacted excess calcium nitrate has a composition shown as point (c) in the ternary diagram of FIG. 2.

The separated aqueous solution 7 is removed to a calcium nitrate replenishment operation (Block D in FIG. 1), where lime 8 and nitric acid 9 are introduced to form calcium nitrate in situ. Sufficient calcium nitrate is introduced in this step to compensate for that which was reacted with strontium sulfate in the celestite ore in the reaction step. The composition of the aqueous solution refortified with calcium nitrate, stream 10 in FIG. 1, is shown as point (d) in the ternary diagram of FIG. 2.

The $Ca(NO_3)_2$-refortified aqueous solution 10 is subjected to evaporative crystallization, an operation shown as Block E in FIG. 1, to remove water 11 and form an aqueous slurry 12 containing strontium nitrate solids. The aqueous phase of the aqueous slurry 12 has a composition shown as point (e) in FIG. 2, which composition contains little dissolved strontium nitrate reaction product.

The product slurry 12 is separated, in an operation shown as Block F in FIG. 1, into solid strontium nitrate 13 that is recovered and a $Ca(NO_3)_2$-containing aqueous mother liquor 2 that is recycled to the reaction step shown as Block A in FIG. 1. The recycled $Ca(NO_3)_2$-containing aqueous mother liquor 2 is ordinarily concentrated further by evaporative removal of water, to produce a concentrated calcium nitrate solution whose composition is approximately that of point (a) in FIG. 2. Although not shown in FIG. 1, this concentration of the aqueous calcium nitrate 2 may be readily accomplished in the reaction vessel (Block A in FIG. 2).

The entire cycle of reaction, extraction, separation, $Ca(NO_3)_2$ replenishment, evaporative crystallization, and product separation is then repeated as described previously.

The following examples are intended to illustrate embodiments of the invention and should not be construed as limiting the invention defined by the claims.

EXAMPLES 1 TO 3; COMPARATIVE EXAMPLES A AND B

Examples 1 to 3 and Comparative Examples A and B illustrate the effect on strontium nitrate yield of the amount of extraction water and mixing time during the extraction step.

About 827 g $Ca(NO_3)_2.4H_2O$ was charged to a 1.5 l glass kettle, and heat was applied to melt the crystals in their water of hydration above a temperature of 43° C. Finely ground celestite ore was then added in an amount of 179 g. The celestite ore for these examples and Examples 4 to 9 contained about 92% by weight $SrSO_4$ and about 5% by weight $CaCO_3$ and had a particle size of which 95% passed through a 200 mesh (U.S.A. Standard) sieve. The calcium carbonate content of the added celestite was partially neutralized to calcium nitrate by the addition of 31 g 35 wt % $HNO_3$.

The resulting mixture was then heated, with stirring, to boiling and about 82 g $H_2O$ removed. The reaction mixture at this point had a Ca:Sr atomic ratio of 3.8:1 and a $H_2O$:Sr molar ratio of 11.4:1. The reaction mixture was refluxed, with stirring, for three hours at a temperature of about 140° C. After refluxing, the reaction mixture was separated into five portions (for use in Examples 1 to 3 and Comparative Examples A and B).

The extraction steps in each of Examples 1 to 3 and Comparative Examples A and B were performed in a food-type blender, into which a predetermined amount of boiling water was added. The amount of water was greater than the amount required for dissolution of $Sr(NO_3)_2$ in the presence of $Ca(NO_3)_2$, in the reaction mixture, and was determined by reference to the phase diagram shown in FIG. 2. The excess (based on total water present in the combined reaction mixture plus added water) ranged from 10-22% in Examples 1 to 3 and was 42 and 59% in Examples A and B, respectively.

After the extraction water was added to the reaction mixture in the blender, the blender was operated for a short period of time, ranging between 30 to 120 seconds. The resultant extraction slurry was then filtered through a paper filter under vacuum. Yields were calculated by analysis of the filtrate for strontium content.

The following table summarizes the extraction step parameters and strontium yields for Examples 1 to 3 and Comparative Examples A and B.

| Example | Strontium Solubilization Water Excess | Mixing Period | Strontium Yield |
|---|---|---|---|
| 1 | 13% | 30 sec. | 84% |
| 2 | 10% | 120 sec. | 78% |
| 3 | 22% | 60 sec. | 65% |
| Comparative A | 42% | 30 sec. | 41% |
| Comparative B | 59% | 120 sec. | 28% |

Examples 1 to 3 suggest that increasing amounts of excess water used in the extraction to solubilize strontium in the reaction mixture, and lengthy extraction mixing periods tend to reduce the strontium extraction yields. Comparative Examples A and B show that unacceptably low strontium extraction yields result when the excess water was more than 40%.

EXAMPLES 4, 5 and 6

Examples 4, 5 and 6 differ from the previous examples in that the extraction step mixing periods were very short, ranging from about 1 second to 35 seconds and the extraction water temperature is only 25° C. (instead of at its boiling point).

The procedure utilized for Examples 4, 5 and 6 was similar to that of Examples 1 to 3, except that the reaction was carried out in a 50 gallon (189 l.) reactor using larger reactant quantities. The Ca:Sr atomic ratio was about 3.6:1 and the $H_2O$:Sr molar ratio was about 10:1 for the reaction of celestite with calcium nitrate. As in the previous examples, the reaction reflux temperature was about 140° C. and reaction time about 3 hours.

The extraction steps for these examples were carried out using water at a temperature of 25° C. and in amounts sufficient to provide an excess of 10% above the quantity required to solubilize the strontium in the refluxed reaction mixture.

The extraction period was varied by utilizing three different types of extractors. In Example 4, a food-type blender was operated for 35 seconds. In Example 5, a static in-line mixer provided a mixing period of about 5 seconds. In Example 6, a homogenizer provided an extraction mixing period of 0.9 second.

Yields of strontium recovered in the aqueous extraction solution, i.e., filtrate, were very similar for all examples: Example 4: 89%; Example 5: 90%; and Example 6: 85%.

EXAMPLES 7, 8 AND 9

Examples 7, 8 and 9 demonstrate that the strontium extraction yield is proportional to the time the reactants in the reaction step are refluxed.

Examples 7, 8 and 9 employed a procedure similar to that described for Example 4. The reaction step Ca:Sr atomic and $H_2O$:Sr molar ratios were 3.6 and 10, respectively, as before. The temperature during the three hour reflux period in the reaction step was 130° C. instead of the previous 140° C.

In Examples 7, 8 and 9 the reflux periods during the reaction step were 0.75, 1.5, and 3.75 hours, respectively.

The extractions were each performed using conditions as described for Example 4: extraction water excess being 10%; extraction mixing time being 35 seconds, and water temperature being 25° C.

Yields of strontium recovered in the aqueous extraction solutions for Examples 7, 8 and 9 were 83%, 87% and 92%, respectively. The results of Example 4, described previously, are consistent with these examples: for a reaction step reflux time in Example 4 of 3 hours, the strontium yield was 89%.

EXAMPLE 10

Example 10 illustrates the purity of strontium nitrate that can be prepared in this method. The celestite ore reactant analyzed as 89.0 wt. % $SrSO_4$, 1.85 wt. % Ca, 1.06 wt. % Ba, 3000 ppm Mg and 2100 ppm $SiO_2$, and its particle size was such that 95% passed through a 200 mesh (U.S.A. Standard) sieve.

In the reaction step, the Ca:Sr atomic and $H_2O$:Sr molar ratios were 4.0 and 13.0, respectively. Reaction temperature was about 140° C., and reflux time was 3 hours.

The reaction mixture was extracted in several equal portions, as in Examples 1 to 3, using from 4-19% excess water at boiling temperature, mixing being for 30 to 120 seconds.

The filtrates obtained from these separate extraction steps were combined, and the combined aqueous extraction solution was heated to boiling to evaporate water.

Water removal was stopped when the boiling temperature had reached about 132° C., a boiling point corresponding to a $H_2O:Ca(NO_3)_2$ molar ratio of about 4:1. At this point, most of the strontium in solution had crystallized as $Sr(NO_3)_2$, leaving essentially all the calcium nitrate still in solution.

The crystals were recovered, water-washed and dried; x-ray diffraction analysis identified the product as strontium nitrate. The strontium nitrate crystals were relatively pure, containing only small amounts of impurities: 0.89 wt. % Ca; 0.44 wt. % Ba; 6.6 ppm Mg; 37 ppm $SiO_2$; 0.43 ppm Na; 5 ppm Al and <0.1 ppm Fe.

We claim:

1. The process of preparing strontium nitrate from celestite ore which comprises
   (a) mixing ground celestite ore with greater than a stoichiometric quantity of calcium nitrate in an aqueous reaction mixture to react strontium sulfate in the celestite with calcium nitrate, the reaction mixture containing insufficient water to solubilize all strontium values in the celestite as strontium nitrate;
   (b) contacting the reaction mixture, quickly and with vigorous agitation, with additional water to rapidly dissolve and extract soluble strontium nitrate reaction product, the total quantity of added water and reaction mixture water being from 100 to 140% of the amount required to solubilize essentially all of the strontium nitrate in the reaction mixture;
   (c) separating the aqueous solution containing solubilized strontium nitrate and unreacted calcium nitrate from the undissolved reaction mixture solids;
   (d) evaporating water from the separated aqueous solution to induce crystallization of strontium nitrate; and
   (e) recovering the strontium nitrate.

2. The process of preparing strontium nitrate from celestite ore which comprises
   (a) mixing ground celestite ore with greater than a stoichiometric quantity of calcium nitrate, the atomic ratio R of Ca:Sr being no more than 6:1, in an aqueous reaction mixture to react strontium sulfate in the celestite with calcium nitrate, the reaction mixture containing sufficient water to provide a water:strontium molar ratio of from $2(R-1)$ to $5.5(R-1)$;
   (b) contacting the reaction mixture, quickly and with vigorous agitation, with additional water to rapidly dissolve and extract soluble strontium nitrate reaction product, the total quantity of added water and reaction mixture water being from 100 to 140% of the amount required to solubilize essentially all of the strontium nitrate in the reaction mixture;
   (c) separating the aqueous solution containing solubilized strontium nitrate and unreacted calcium nitrate from the undissolved reaction mixture solids;
   (d) evaporating water from the separated aqueous solution to induce crystallization of strontium nitrate; and
   (e) recovering the strontium nitrate.

3. The process of claim 1 or 2 which further comprises recycling mother liquor, which remains after crystallization and recovery of the strontium nitrate and which contains unreacted calcium nitrate, for use in the reaction of additional celestite ore with calcium nitrate.

4. The process of claim 3 which further comprises introducing calcium nitrate into the separated aqueous solution from step (c), prior to crystallization of strontium nitrate.

5. The process of claim 3 which further comprises introducing calcium nitrate into the recycled mother liquor.

6. The process of claim 1 or 2 wherein the stoichiometric excess of calcium nitrate is sufficient to provide an atomic ratio R of calcium to strontium in the reaction mixture of from 2.5 to 6 Ca:Sr.

7. The process of claim 1 or 2 wherein the molar ratio of water to strontium in the reaction mixture is about $3(R-1)$ to $4.5(R-1)$ where R is the Ca:Sr atomic ratio in the reaction mixture.

8. The process of claim 1 or 2 wherein the reaction temperature is from 75° C. to 250° C.

9. The process of claim 1 or 2 wherein the celestite-calcium nitrate reaction period is from 0.25 to 40 hours.

10. The process of claim 1 or 2 wherein the period in which the reaction mixture is contacted, with vigorous agitation, with the additional water is no more than two minutes.

11. The process of claim 1 or 2 wherein the period in which the reaction mixture is contacted, with vigorous agitation, with the additional water is from about one second to one minute.

12. The process of claim 1 or 2 wherein the sufficient additional water is added to the reaction mixture in the extraction step to provide a total amount of water, both added water and water in the reaction mixture combined, that is equivalent to 100 to 120% of the amount required to solubilize essentially all of the strontium nitrate in the reaction mixture.

13. The process of claim 1 or 2 which further comprises adding nitric acid to the aqueous reaction mixture in an amount sufficient to react with calcium compounds in the celestite ore, thus forming calcium nitrate in situ.

14. The process of claim 1 or 2 wherein sufficient water is evaporated from the separated aqueous solution during the crystallization of strontium nitrate to reduce the molar ratio of water to calcium nitrate in the evaporated solution to about 4:1.

15. The process of claim 1 or 2 wherein the extraction step is performed with a total quantity of added water and reaction mixture water of from 100 to 120% of the amount required to solubilize essentially all of the strontium nitrate in the reaction mixture and with an agitation period sufficiently short to recover strontium nitrate in an overall reaction yield of at least 75%, based on strontium sulfate in the celestite.

16. The process of claim 1 or 2 wherein the ground celestite ore has an average particle size of 1–150 microns.

* * * * *